United States Patent [19]

Yoerger et al.

[11] 3,975,352

[45] Aug. 17, 1976

[54] REPELLENT COMPOSITIONS AND ELEMENTS CONTAINING THE SAME

[75] Inventors: William E. Yoerger, Rochester; John M. McCabe, Pittsford; John F. Wright, Rochester, all of N.Y.

[73] Assignee: Eastman Kodak Company, Rochester, N.Y.

[22] Filed: Mar. 13, 1975

[21] Appl. No.: 558,030

Related U.S. Application Data

[62] Division of Ser. No. 497,348, Aug. 13, 1974, Pat. No. 3,901,700, which is a division of Ser. No. 361,370, May 17, 1973, Pat. No. 3,859,090.

[52] U.S. Cl. .............................. 260/33.8 F; 96/1 R; 96/1 LY; 96/1.5; 96/31; 96/33; 101/450; 101/457; 106/2; 260/29.1 SB; 526/245

[51] Int. Cl.[2] ........................ C08K 5/02; C08K 5/54

[58] Field of Search .................. 260/33.8 F, 89.5 H, 260/29.1 SB; 106/2

[56] References Cited

UNITED STATES PATENTS

| | | | |
|---|---|---|---|
| 2,592,069 | 4/1952 | Reid | 260/85.7 |
| 2,642,416 | 6/1953 | Ahlbrecht et al. | 260/83.5 |
| 2,826,564 | 3/1958 | Bovey et al. | 260/89.5 H |
| 2,839,513 | 7/1958 | Ahlbrecht et al. | 260/89.5 H |
| 3,016,823 | 1/1962 | Thurlow | 96/33 |
| 3,677,178 | 7/1972 | Gipe | 96/36.3 |
| 3,775,115 | 11/1973 | Sorkin et al. | 96/1.8 |
| 3,790,382 | 2/1974 | Dahlman | 96/33 |

*Primary Examiner*—Lewis T. Jacobs
*Assistant Examiner*—H. H. Fletcher
*Attorney, Agent, or Firm*—J. R. Everett

[57] ABSTRACT

A repellent composition containing an oil of low volatility having a surface energy less than 27 dynes/cm. and a solid fluorinated polymer such as a polymer of a fluoroalkyl acrylate. In accord with certain embodiments of the invention, a resinous binder and/or a particulate fluorocarbon powder may be added to the repellent composition. The repellent composition may be used to prepare an ink repellent surface for a "waterless" lithoplate or as a coating on the surface of an electrographic element from which a liquid developed electrographic image is transferred.

6 Claims, No Drawings

REPELLENT COMPOSITIONS AND ELEMENTS CONTAINING THE SAME

This is a division of application Ser. No. 497,348, filed Aug. 13, 1974, now U.S. Pat. No. 3,901,700, issued Aug. 26, 1976, which in turn is a division of application Ser. No. 361,370, filed May 17, 1973, now U.S. Pat. No. 3,859,090, issued Jan. 7, 1975.

Field of Invention

The present invention relates to a novel repellent composition and various useful elements, particularly, electrographic and/or planographic elements, (such as lithoplates), bearing a coating of such a repellent composition.

Related Art

A great deal of work has been undertaken in the past relating to the use of repellent compositions (or as they are sometimes called "abhesive" compositions). Such compositions are generally characterized by their ability to repel most other kinds of materials including solid materials such as various natural and synthetic polymeric articles, for example, sheets, blocks, filaments and powders, and liquid materials such as aqueous-based and oil-base compositions, for example, dye and pigment-containing compositions, including inks, lacquers, paints, and various liquid electrographic and photographic developing compositions.

For instance, U.S. Pat. No. 3,247,825, issued Apr. 26, 1966, describes a non-wettable insulator belt made of Teflon, a trademark for poly(tetrafluoroethylene)—containing materials manufactured by E.I. duPont Nemours and Co., for use in an electrographic imaging process employing a printing ink composition. The non-wettable Teflon belt is used to transfer relatively clean ink images electrographically formed on the belt to a receiving sheet. German Offenlegungschrift (OLS) No. 2,204,745 dated Aug. 17, 1972 (and referred to hereinbelow in greater detail) describes an electrographic lithographic process similar to that of U.S. Pat. No. 3,247,825.

In addition, U.S. Pat. Nos. 2,990,278 issued June 27, 1961; 3,146,145 issued Aug. 25, 1964; 3,185,777 issued May 25, 1965; and 3,515,584 issued June 2, 1970 describe various types of lubricious materials useful in electrographic processes and elements because of the inability of dry or tackified electrographic toner powders to adhere substantially to such materials. Among the various abhesive materials described in the above patents are poly(tetrafluoroethylene) and other similar fluorinated vinyl carbon materials, certain silicone materials, etc.

There have also appeared a number of references in the art to the use of abhesive materials such as fluorocarbons and certain silicones as ink repellent background areas of "waterless" lithographic printing surfaces; that is, lithographic printing surfaces having background areas repellent to both oil-based printing inks and aqueous-based dampening agents. Planographic printing processes using such waterless printing surfaces do not require the use of a separate aqueous dampening agent. See British Pat. No. 1,146,618 dated Mar. 26, 1969; U.S. Pat. No. 3,511,178 issued May 12, 1970; U.S. Pat. No. 3,606,922 issued Sept. 21, 1971; U.S. Pat. No. 3,677,178 issued July 18, 1972; German OLS No. 2,204,745 dated Aug. 17, 1972.

As is apparent from the literature noted above, several repellent or abhesive compositions have been investigated and proposed previously for use in electrographic and/or planographic elements and processes. However, subsequent research and testing has shown various problems and defects which may be encountered when using these previously developed compositions. For example, the above repellent silicones and repellent fluorocarbon materials provide coatings having relatively soft surfaces that are subject to abrasion as well as contamination and smudging by electrographic and planographic developer apparatus and by developer and ink compositions. Such defects tend to destroy the repellent or abhesive characteristics of these compositions thereby substantially decreasing the ability of these materials to effectively transfer clean developer or ink images.

In addition, it has been found that the abhesive silicone materials such as described in U.S. Pat. No. 2,990,278, U.S. 3,511,178 and German OLS No. 2,204,745 present a difficult toner fusion problem when used as an abhesive coating for an electrophotographic element. That is, it has been found extremely difficult to obtain good adhesion between conventional oleophilic electroscopic toner materials and an abhesive silicone surface. As a result, when such an electrographic element is used as a planographic printing plate, the ink-receptive image on the plate (which is composed of the electroscopic toner) tends to deteriorate rapidly and is generally useful for the production of only a small number of clean, high quality copies.

SUMMARY OF THE INVENTION

In accord with the present invention we have discovered a useful repellent composition comprising (a) an oil of low volatility having a surface energy less than about 27 dynes/cm and selected from the group consisting of fluorinated oils and poly(siloxane) oils and (b) a solid fluorinated polymer having at least one repeating unit of the following formula:

$$(CHR^1-\underset{\underset{Y}{|}}{C}R^1) \qquad \text{I.}$$

wherein $R^1$ represents a member selected from the group consisting of hydrogen and alkyl groups having one to about four carbon atoms, and Y represents a moiety having one of the following formulas:

$$-O-\overset{\overset{O}{\|}}{C}-(CH_2)_n-R \qquad \text{II.}$$

or $$-\overset{\overset{O}{\|}}{C}-O-(CH_2)_n-R \qquad \text{III.}$$

wherein $n$ is 0 or 1 and R is a fluorinated alkyl, including branched and straight chain alkyls as well as fluoroalkoxy substituted fluorinated alkyls, having one to about 20 carbon atoms.

In accord with a preferred embodiment of the present invention, we incorporate a polymeric binder in the above-described repellent composition to improve its toughness and abrasion resistance and to reduce the amount of the substantially solid fluorocarbon polymer which generally is much more expensive than suitable polymeric binders. Suitable polymeric binders may generally be chosen from a variety of commercially available resins as will be described in greater detail hereinafter.

In accord with another embodiment of the invention, the toughness and abrasion resistance of the repellent compositions described above may be further enhanced by incorporation therein of a minor amount of an inert, finely-divided fluorocarbon powder.

The repellent composition of the present invention is particularly suitable as an abhesive composition for use in the production of "waterless" printing plate elements of the type described hereinbefore. Thus, in accord with one embodiment of the invention, the above-described repellent composition is coated on a support to form an unimaged waterless printing plate element. If desired, such waterless printing plate elements may have advantageously incorporated therein a light-sensitive interlayer such as a photocrosslinkable polymer, a photoconductive material, and the like to facilitate imaging the waterless printing plate element.

The repellent composition of the present invention is also particularly useful in liquid developed electrographic image transfer processes. In such processes a wet, liquid-developed electrostatic charge image carried on a dielectric-surfaced support is transferred to a suitable receiving sheet. One such process is that referred to above in U.S. Pat. No. 3,247,825. In accord with the present invention, we have found that transfer of such wet, liquid-developed electrographic images is greatly enhanced by applying the repellent composition described above as a surface layer on the support prior to the formation and the liquid development of electrostatic charge images thereon. As a result, wet, liquid-developed images formed on such repellent coated surfaces are more completely transferred to receiving sheets. Also, the repellent coated surfaces require little or no cleaning after image transfer prior to formation and development of a subsequent image on the repellent surface.

DESCRIPTION OF THE PREFERRED EMBODIMENTS

The repellent composition of the present invention, as suggested above, provides a number of advantages. In the first place, as indicated, this repellent composition is particularly useful in the production of waterless printing plate elements.

Waterless printing plates as recently developed in the lithographic art have generally relied upon a poly(siloxane) elastomeric surface to provide an abhesive surface which is repellent to both conventional aqueous dampening agents and to lithographic oil-based printing inks. One problem with these poly(siloxane) surfaces is their tendency to easily abrade which may result in scumming of the copy sheets which are to be printed from such a litho plate.

In addition, waterless printing plates having a conventional poly(siloxane) abhesive surface and which are imaged by electrophotographic processes are not readily compatible with conventional electrophotographic developer compositions. This is because conventional electrophotographic developer compositions including both conventional liquid and dry developer materials typically do not adhere well to abhesive poly(siloxane) surfaces. Accordingly, the electroscopic toner image formed on the surface of such waterless printing plates and which is used as the ink-accepting image surface of the plate exhibits poor wear properties, that is, exhibits a tendency to rub off the plate during the printing process.

In contrast, the waterless printing plates of the present invention eliminate or at least substantially reduce the above-noted problems associated with waterless printing plates containing an abhesive silicone material. For example, the repellent composition of the present invention is much more compatible with conventional electroscopic toner materials, i.e., conventional toner materials adhere well to the repellent composition of the invention when subjected to conventional toner fixing techniques such as heat fusing or pressure and heat fusing. Moreover, the repellent composition of the invention, especially that embodiment of the composition which contains a polymeric binder, exhibits improved toughness and abrasion resistance.

As indicated above, the repellent composition of the present invention is also particularly useful in liquid developed electrographic image transfer processes. In such processes, it has been found that the repellent compositions of the present invention provide improved transfer efficiency, i.e., more complete transfer of the liquid developed toner image is obtained. And, the repellent coated surfaces on which the original liquid developed image is formed requires little or no cleaning before it is ready for reuse.

In addition to the foregoing advantages, it is apparent that the repellent composition of the present invention will be of special utility and afford particular advantages in any situation which may require the use of a repellent coating composition which exhibits good antitack and release properties.

The oil component of the repellent composition of the present invention may be selected from a variety of flourinated oils and poly(siloxane) oils which are generally readily available commercially. As indicated, these oils should have a low volatility so that they are not susceptible to evaporation from the resultant element under atmospheric pressure and normal room temperatures and should have a low surface energy less than about 27 dynes/cm. to enhance the abhesive properties of the repellent composition. Among the various useful fluorinated oils exhibiting the above-noted characteristics are materials such as the perfluoro alkyl polyether polymeric fluids commercially available from E.I. duPont Nemours and Co. under the tradename of Krytox fluids, particularly Krytox 143 AC, 143 AD, and 143 CZ fluids, and other similar perfluoro alkyl polyether fluids available from Montecatini Edison Co. under the tradename of Fomblin fluids. Generally these perfluoro alkyl polyethers are polymers having as a repeating unit thereof the following perfluorinated moiety:

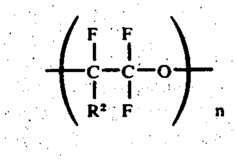

IV.

wherein $n$ is an integer of about 25 to about 50 and wherein $R^2$ represents a fluorine atom or a perfluorinated alkyl group having from 1 to about 4 carbon atoms.

Still other low surface energy fluorinated oils useful in the present invention are copolymers of trifluoronitrosomethane and tetrafluoroethylene. Other useful fluids are the poly(perfluoroalkylene triazines) as described in U.S. Pat. No. 3,489,727.

The low surface energy poly(siloxane) oils useful in the present invention exhibit the same general characteristics as the above-described fluorinated oils. That is, these poly(siloxane) oils have a surface energy less than about 27 dynes/cm and low volatility under atmospheric pressure and normal room temperature conditions. Such poly(siloxane) oils are well-known and readily available commercially. These poly(siloxane) oils are generally characterized by the presence of the following repeating unit in their polymeric structural chain:

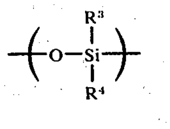
V.

wherein $R^3$ and $R^4$, which may be the same or different, represent an alkyl having 1 to 4 carbon atoms, phenyl, or halogenated alkyl or phenyl.

Representative of preferred poly(siloxane) oils are the following materials: dimethyl poly(siloxane) fluid; alkylaryl poly(siloxane) fluid available from Dow Corning under the tradename D.C. 230; fluorinated poly(siloxane) fluids believed to have the following structural formula:

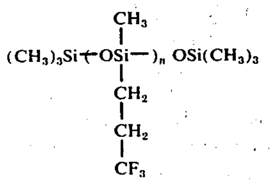
VI.

available commercially from Dow Corning under the tradename F.S. 1265; and a series of various other poly(siloxane) fluids believed to have the structural formulas noted hereinbelow as VII–X:

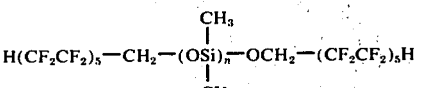
VII.

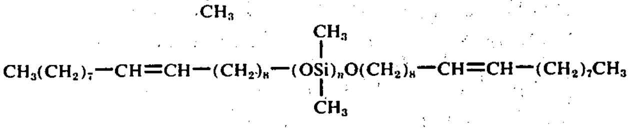
VIII.

IX.
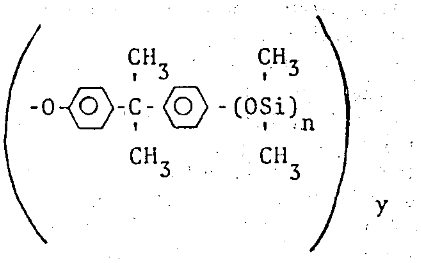

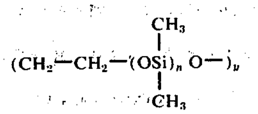
X.

wherein $n$ and $y$ in Formulas VI–X are integers greater than 3.

The term low volatility as used herein is defined to mean an oil having a boiling point at 1 mm.Hg which is greater than 100°C.

Preferred low surface energy fluorinated oils and poly(siloxane) oils useful in the repellent compositions of the present invention generally have a viscosity less than about 5000 centistokes at 38°C., preferably within the range of from about 50 to about 1000 centistokes. The amount of the low surface energy fluorinated oil or poly(siloxane) oil contained in the repellent compositions of the present invention may vary over a considerable range. Generally, amounts of low surface energy oil within the range of from about 1 to about 40% by weight, preferably about 2.5 to about 30% by weight, based on the total weight of the repellent composition are useful. Although larger amounts than this may be used, it is generally found that repellent compositions containing amounts of the oil in excess of about 40% by weight are so soft that they are difficult to utilize in most applications; however, in certain situations where waxy compositions and appreciable amounts of the oil component can be tolerated, amounts in excess of 40% by weight of the low surface energy oil could be used. Amounts of the low surface energy component less than about 1 weight percent based on the total weight of the repellent composition could also be utilized in accord with the present invention. However, it will be appreciated that when such small amounts of the oil component are employed, the useful effects provided by the oil component may be so slight as to be largely unnoticed in most applications.

The solid fluorinated polymers useful in the present invention are characterized by the presence of at least one repeating unit in the polymer having formula I shown hereinabove. Typically, these fluorinated polymers, whether homopolymers or copolymers, have a fluorine content of at least about 40% based on the total molecular weight of the polymer. These polymers exist in solid form at normal temperature (i.e., 25°C) and pressure (1 atmosphere) conditions whereas the fluorinated low surface energy oils described hereinabove are liquid at 25°C. and 1 atmosphere. Best results have generally been obtained in accord with the invention wherein R of formula II and III above contains a perfluorinated terminal carbon atom, i.e., $-CF_3$.

Representative solid fluorinated polymers which may be employed in the present invention are substantially solid polymeric fluorocarbons having repeating units shown in formulas XI–XV hereinbelow:

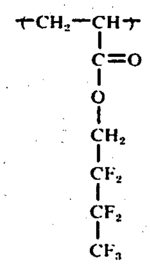
XI.

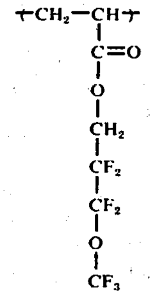
XII.

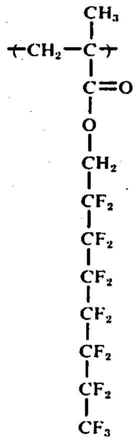
XIII.

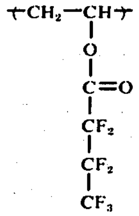
XIV.

-continued

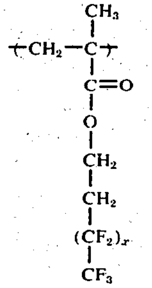
XV.

wherein X is an integer of 1 to about 18.

As indicated above both fluorinated homopolymers and copolymers may be used as the solid fluorinated polymer in the present invention. For example, copolymers containing two or more different repeating units such as those shown in formulas XI–XV above may be used. Alternatively, copolymers containing both fluorinated repeating units such as those described above and non-fluorinated units, for example, repeating units of alkyl acrylates and methacrylates such as methyl methacrylate, may be employed. Typically, the solid fluorinated polymers used in the present invention contain at least about 30 repeating units.

The solid fluorinated polymers used in the present invention are readily available commercially and accordingly description of their preparation is deemed unnecessary. These materials are available under a variety of tradenames from numerous chemical suppliers. Exemplary of useful commercially available materials are the following: poly(1,1-dihydroperfluorobutyl acrylate) and poly(3-perfluoromethoxy-1,1-dihydroperfluoropropyl acrylate) sold by the Minnesota Mining and Manufacturing Co., NyeBar Type C fluoro polymers sold by the William F. Nye Inc. Co., and fluoro polymers sold by the E.I. duPont Nemours Co. under the tradename Zepel 2979 polymers and TLF-2916 Fabric fluoridizer polymers. If additional information is desired concerning the preparation and manufacture of materials representative of the above-described solid fluorinated polymers, reference may be made to U.S. Pat. Nos. 2,592,069 issued Apr. 8, 1952 and 2,642,416 issued June 16, 1953.

The relative amount of the solid fluorinated polymers used in the repellent composition of the present invention may vary considerably. As will be apparent, the amount of solid fluorinated polymer will depend, at least in part, upon the specific low surface energy oil which is used. In addition, the amount of the fluorinated polymer will vary depending upon whether a polymeric binder is incorporated in the repellent composition as described hereinabove. Typically, useful repellent compositions in accord with the present invention comprise from about 5 to about 98% by weight of the solid fluorinated polymer component, and preferably from about 5 to about 30 percent by weight of said solid fluorinated polymer.

As indicated hereinbefore, and in accord with a preferred embodiment of the invention, we may employ a resinous binder together with the low surface energy oil and solid fluorinated polymer in the repellent compositions of the present invention. The binder resin provides added toughness and abrasion resistance to the resultant repellent composition. In addition, the binder resin, especially those selected from the preferred class of binder resins described hereinbelow, significantly reduces the amount of the more expensive solid fluorinated polymer used in the repellent compositions of the present invention. In general, the resinous binder may be any hydrophobic, film-forming polymeric material. Materials of this type include silicone resins, the poly(acrylic ester) and poly(methacrylic ester) resins, and fluorinated hydrocarbon resins, and mixtures of the foregoing materials. Representative examples of various individual members of these binder materials include the following resinous materials: poly(methylmethacrylate), poly(n-butylmethacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene, and tetrafluoroethylene, poly(vinylidene fluoride), and the like. Such materials as those indicated immediately above have been described in the prior art and are commercially available from a number of manufacturers.

The fluorinated hydrocarbon resins are especially preferred for use as the binder resin (if one is used) in the repellent compositions of the invention. These preferred fluorinated hydrocarbon resins are readily compatible with the other components of the repellent compositions of the invention and, in addition, appear to enhance the repellent properties of the resultant composition.

When a binder resin is used in the present invention, the amount employed in the repellent composition may vary considerably. Typically, the resinous binder is present in an amount varying from 1 to about 85 weight percent of the repellent composition. Typically, if the resinous binder component is not one of the preferred fluorinated hydrocarbon resinous binders indicated hereinabove, the amount thereof which may be advantageously utilized in the present invention is reduced and generally lies within the range of from 5 to about 30 weight percent of the repellent composition. However, when one of the preferred resinous binder components is used the amount thereof which can be effectively employed in accord with the preferred embodiment of the present invention is considerably increased. In such case, the amount of the binder component may be as high as about 85 weight percent of the repellent composition and preferably lies within the range of from 50 to about 80 weight percent thereof.

Optionally, in accord with another embodiment of the invention the toughness and abrasion resistance of the repellent composition of the present invention may be further enhanced by incorporation of a minor amount of inert, solid, particulate fluorocarbon powder in the repellent composition. For example, particulate fluorocarbon material sold as FEP TEFLON powder by E.I. duPont Nemours and Co. may be incorporated in the repellent compositions of the invention in amounts up to about 40 percent by weight, preferably from 5 to about 30 percent by weight, based on the total dry weight of the resulting repellent coating. The particulate fluorocarbon powder acts as an antiadhesive (or abhesive) filler material for the repellent composition of the invention. This material, if used in the repellent composition of the invention, retains its particulate form within the repellent composition and appears as discrete, finely-divided particles uniformly distributed throughout the repellent composition. Typically, these fluorocarbon filler particles have an average particle size of less than about 1 micron.

The repellent composition of the present invention, as will be apparent, has utility in and of itself as a self-supporting film. As such, the composition may be coated out and dried to form useful self-supporting films.

More generally, however, the repellent composition of the present invention finds application when coated on a suitable supporting element. The particular support on which the repellent composition may be coated is not critical and may be selected with regard to the particular use for which the resultant element is intended. For example, various supports which may be used include wood; paper; metals; plastics; including natural and synthetic resins; laminates; and multilayered supports such as various metal coated plastic supports and various light-sensitive elements comprising a base, a suitable light-sensitive layer(s), and any necessary or desired intermediate subbing layers.

The particular process by which the repellent composition of the present invention is coated on a suitable support is not critical to the present invention. A variety of different coating methods are well known in the art including such methods as spray-coating, dip-coating, and the like. Moreover, the repellent composition of the present invention may be coated either in the form of a dispersion or as a substantially homogeneous solution. Typically, the repellent compositions of the present composition are coated from organic solvent solution or dispersion. A variety of different organic solvents may be utilized in the coating operation including such organic solvents as acetone, methylethyl ketone, ethyl acetate, dimethylacetamide, halogenated hydrocarbon solvents such as methylene chloride, and various fluorinated hydrocarbon solvents such as Freon, a trademark of E.I. duPont for a group of halogenated hydrocarbons containing one or more fluorine atoms such as 1,1,2-trichloro-1,2,2-trifluoroethane, and the like. Mixtures of these various organic solvents and other conventional solvent materials may also be used.

The thickness of the resultant repellent compositions of the present invention (when coated and dried to eliminate or substantially reduce any residual dispersion or solvent liquid) may vary over a wide range. Coatings having a thickness in the range of from about 0.1 micron to about 500 microns or more are useful, with a coating thickness within the range of from about 0.2 microns to about 200 microns suitable for most applications.

As noted hereinabove, the repellent compositions of the present invention are especially useful in the production of waterless planographic printing plates. Such plates are especially desirable because they eliminate the need for the aqueous dampening agent required in conventional lithographic printing processes. That is, these compositions effectively repel or remain substantially non-wettable by oil-based liquids such as conventional planographic oil-base printing inks without the addition of an aqueous dampening agent.

To use the repellent compositions of the present invention is a typical waterless printing process, one simply forms an oleophilic image on the surface of a planographic printing element which has been overcoated with the repellent composition of the present invention. Because the repellent composition of the present invention is substantially nonwettable by and repels generally all oil-based compositions, many materials will be more oleophilic than the repellent composition of the present invention and can be employed as the oleophilic imaging material to which conventional oil-based printing inks will preferentially adhere. Once an oleophilic image is formed on the surface of a printing element bearing the repellent composition of the present invention, the element, thus imaged, is ready for use as a printing plate. Accordingly, it may be affixed to conventional planographic printing apparatus to produce the desired number of copies. (Of course, because plates bearing the repellent compositions of the present invention do not require the use of aqueous dampening agents which are conventionally employed in planographic printing apparatus, one can eliminate the aqueous dampening agent when waterless plates of the present invention are run on conventional printing apparatus.)

Oleophilic images may be formed on waterless printing plates employing the repellent compositions of the present invention by any number of methods. For example, an element comprising a suitable support overcoated with the repellent composition of the present invention may be imaged simply by removing the repellent overcoating of the present invention in the image areas to expose the surface of the support. In such case, the exposed surface of the support serves as the oleophilic image areas, preferentially receiving conventional printing inks, whereas the surface areas of the element which comprise the repellent composition of the present invention, repel printing ink and serve as non-image, non-ink receptive background areas.

To facilitate imaging printing elements of the present invention, a light sensitive layer may be incorporated in the element. For example, a photocrosslinkable polymer material may be incorporated in the element in a manner similar to that described in Gipe, U.S. Pat. No. 3,677,178 issued July 18, 1972; and U.S. Pat. No. 3,511,178 issued May 12, 1970. As described in the aforementioned Gipe U.S. Pat., the light sensitive material may be incorporated as an interlayer between a suitable support and an overcoat of the repellent composition of the present invention; or the repellent composition of the present invention may be used as an interlayer overcoated by a suitable light sensitive top coat. In such case, the repellent composition of the present invention is substituted for the abhesive poly(-siloxane) coating employed in the aforementioned patent publications incorporated herein by reference thereto.

As suggested earlier herein, waterless printing elements bearing the repellent or abhesive composition of the present invention may be imaged electrographically. In such case, an electrographic element bearing a coating of the repellent composition described herein is employed.

In accordance with a preferred embodiment of the present invention, an electrographic image may be formed on a suitable electrographic element bearing a repellent coating of the present invention by a variety of well-known electrographic techniques. A preferred electrographic imaging method is the electrophotographic process. If an electrophotographic process is utilized to form an electrographic image, it is generally advantageous to sandwich a photoconductive layer between the support and the repellent surface layer of the electrographic element and form an electrostatic charge image directly thereon. In other instances, a photoconductive element may be used to electrophotographically provide an electrostatic charge image formed on the repellent surface of a separate electrographic receiving element. In the latter case, the photoconductive element may be reused and the repellent surface-coated electrographic element used in the present invention functions as a receiving sheet on which an electrostatic charge pattern is formed or transferred. In another embodiment of the invention an electrographic toner particle image, rather than an electrostatic charge image as discussed above, may be transferred to a repellent surface electrographic receiving element. For example, using conventional electrophotographic techniques a toner particle image may be formed on a reusable photoconductive element and then transferred in imagewise manner to a repellent surfaced electrographic receiving element.

The formation of an ink-receptive image physically adhered to the repellent surface of the electrographic element is accomplished according to the present invention through the use of an electrostatic developer comprising finely-divided oleophilic electroscopic marking particles. Both dry and liquid electrostatic developers which contain such marking particles may be used.

The electrographic elements typically used in the present invention either as an independent element from which an electrostatic charge image may be transferred or as a base on which a layer of the repellent composition described herein may be applied are comprised of a support, typically transparent, such as a poly(ethylene terephthalate), cellulose acetate or the like photographic film supports, typically having coated thereon a conductive coating which may be transparent such as vacuum evaporated nickel, cuprous iodide, a conducting polymer as described, for example, in U.S. Pat. No. 3,007,901 and similar materials.

The conducting support may then be overcoated with a photoconductive layer. If desired, it may be useful to insert various subbing interlayer(s) between the conductive support and the photoconductive layer, for example an adhesive interlayer and/or a barrier layer. The photoconductive layer may be comprised of a binder and a photoconductor. Of course, polymeric photoconductors such as substituted and unsubstituted polyvinyl carbazoles and certain vacuum deposited photoconductive materials such as selenium can be used without a separate binder. In addition to polymeric photoconductors a wide varier of photoconductive substances can be used in the elements of this invention. Typical photoconductive materials include organic, organo-metallic, and inorganic photoconductive materials. Useful organic photoconductive materials include organic amine photoconductors, polyarylalkane photoconductors, and diarylamino-substituted chalcones, etc. A partial listing of publications describing these and other organic photoconductive materials is listed below and hereby incorporated by reference thereto: U.S. Pat. Nos. 3,139,338; 3,139,339; 3,140,946; 3,141,770; 3,148,982; 3,155,503; 3,180,730; 3,240,597; 3,257,202; 3,257,303; 3,257,504; 3,265,496; 3,265,497; 3,274,000, 3,527,602; 3,526,501; 3,542,544; 3,533,786; 3,542,546; 3,421,891 and Belgium Pat. No. 728,563.

Representative organo-metallic photoconductive materials are the organic derivatives of Group IVa and Va metals such as those having at least one amino-aryl group attached to the metal atom. Exemplary organo-metallic compounds are the triphenyl-p-dialkylaminophenyl derivatives of silicone, germanium, tin and lead and the tri-p-dialkylaminophenyl derivatives of arsenic, antimony, phosphorous and bismuth. The organo-metallic or organic photoconductor materials used in the photoconductive composition are generally present in an amount equal to at least about one weight percent of the photoconductive composition. The upper limit of the amount of organo-metallic organic photoconductive substance present can widely vary in accordance with usual practice. Generally the photoconductive composition contains less than about 99 weight percent of an organic or organo-metallic photoconductor material. A preferred weight range for an organic or organo-metallic photoconductive substance in the photoconductive layer of the element of the present invention is from 10 to bout 60 weight percent.

As noted hereinabove, inorganic photoconductive materials may also be used in the element of the present invention. These materials are generally well known in the art and include such inorganic photoconductive materials as zinc oxide, cadmium sulfide, cadmium selenide, lead oxide, selenium, selenium derivatives, mixtures thereof, etc. These photoconductive inorganic materials may also be dispersed in a polymeric binder to form a photoconductive composition which may be coated on a support.

Typically a sensitizing dye or other material is also incorporated in the photoconductive composition. A wide variety of such sensitizing materials are known in the art. These materials are generally selected depending on the particular photoconductive substance utilized. For example, sensitizing compounds useful with an organic photoconductive material would include a wide variety of sensitizing materials. A partial list of such materials includes pyryliums, including thiapyrylium dye salts, disclosed in VanAllan et al. U.S. Pat. No. 3,250,615; fluorenes; aromatic nitro compounds of the type described in U.S. Pat. No. 2,610,120; anthrones like those disclosed in U.S. Pat. No. 2,670,284; quinones, such as those described in U.S. Pat. No. 2,670,286; benzophenones described in U.S. Pat. No. 2,670,287; thiazoles, such as those described in U.S. Pat. No. 2,732,301; mineral acids; carboxylic acids, such as maleic acid, dichloroacetic acid, salicylic acid; sulfonic and phosphoric acids; and various dyes, such as cyanine (including carbocyanine), merocyanine, diarylmethane, thiazine, azine, oxazine, xanthene, phthalein, acridine, azo, anthraquinone dyes and the like and mixtures thereof. Preferred sensitizing dyes for use with organic photoconductive materials include pyrylium and thiapyrylium salts, and cyanines including carbocyanine dyes. These sensitizing dyes may be present in photoconductive compositions in widely varying amounts. Normally, the sensitizer is added in a concentration range from about 0.001 to about 30 percent by weight based on the weight of the photoconductive composition. Preferably, the sensitizer is added to the coating composition in an amount of about 0.1 to about 10 percent by weight of the total photoconductive composition.

Preferred binders for use in preparing the photoconductive layers of the photoconductive compositions used in the present invention generally are film-forming polymeric binders having fairly high dielectric strength and which serve as good electrically insulating film-forming vehicles. Materials of the type comprise styrene-butadiene copolymers, silicone resins; styrene alkyd resins; silicone alkyd resins, soya-alkyl resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methyl methacrylate), poly(n-butylmethacrylate), poly(isobutyl methacrylate), etc.; polystyrene; nitrated polystytrene; polymethylstyrene; iso-butylene polymers; polyesters, such as poly(ethylene alkylenebisaryloxyalkylene terephthalate); phenol formaldehyde resins; ketone resins; polyamides; polycarbonates; polythiocarbonates; etc. Methods of making resins of this type have been described in the art, for example, styrenealkyd resins can be prepared by the method described in U.S. Pat. Nos. 2,361,019 and 2,258,423. Suitable resins of the type contemplated for use in the photoconductive layers of the invention are sold under such trademarks as VITEL PE-101, CYMAC, Piccopale 100, Saran F-220, and LEXAN 105 and 145. Other types of binders which can be used in the photoconductive layers of the elements of the invention include such materials as paraffin, mineral waxes, etc.

The photoconductive layer used in the element of the present invention can be applied to the underlying support in the form of a homogeneous coating composition including the photoconductor, sensitizer, and binder (if one is used) dissolved in a suitable solvent. Or, the photoconductive substance, such as an inorganic photoconductive material may be dispersed in the form of finely-divided particles in a resinous binder, such as a binder solution, and applied to the support in the form of a coating composition having dispersed therein the photoconductive material and the sensitizing dye, if a sensitizing dye is utilized. Alternatively, the photoconductive composition including an organic photoconductor, sensitizing dye and binder may be applied to the support as a heterogeneous composition such as described in Light, U.S. Pat. No. 3,615,414, issued Oct. 26, 1971, hereby incorporated by reference thereto. If the photoconductive composition is applied to the support in the form of a homogeneous dope, solvents which may be used and the vehicle for the photoconductive dope composition include a number of solvents such as benzene, toluene, acetone, 2-butanone, chlorinated hydrocarbons, for example, methylene, chloride, ethylene chloride, etc., ethers, for example tetrahydrofuran, or mixtures of these solvents, etc.

Coating thicknesses of the photoconductive composition on the support can vary widely in accordance with usual practice. Normally, a coating in the range of about 3 microns to about 300 microns is useful.

If desired, an adhesive interlayer or subbing layer may be inserted between the photoconductive composition and the repellent overcoat.

If the repellent-surfaced electrographic element used in the present invention does not have a photoconductive layer incorporated therein, the electrographic element may be used as a receiving element for an electrostatic charge image. In such case, as noted above, the electrographic element comprises a support, generally an electrically conductive support, having the repellent composition layer coated thereover. If desired, various intermediate subbing layers may also be used to provide improved adhesion or to improve the electrical properties of the electrographic element. One type of element which may be usefully employed as a base on which the abhesive layer may be coated is described in Gramza and Robinson, U.S. Pat. No. 3,519,819. Another useful type of abhesive surfaced receiving element which may be employed in the invention comprises a multi-layer element having a base containing at least two layers, namely, a first layer comprising a conductive support, e.g. a conductive paper support, and a second layer coated thereover comprising a dielectric layer having a surface of the repellent composition described hereinabove. This type of receiving element is used in accompanying Example 5, and represents a preferred electrographic element for use in the invention. A detailed description of a preferred electrophotographic process which may be used in conjunction with this element may be found in U.S. Pat. Nos. 2,825,814; 2,833,648; 2,937,943; and 2,975,052. According to a preferred technique, the multi-layered receiving element is used in combination with a roughened surface photoconductive element as described in U.S. patent application Ser. No. 197,488, filed Nov. 10, 1971.

As noted hereinabove, electroscopic marking particle (i.e. toner particles) are used in combination with the repellent-surfaced electrographic elements of the invention. These particles are typically used in conjunction with an electrostatic developer. The electroscopic marking particles should be oleophilic, that is capable of accepting an oil-based lithographic printing ink. A variety of electrostatic developers may be used. These developers generally comprise a carrier vehicle and marking particles. The carrier vehicle may comprise various materials and, as the name implies, serves as a medium for carrying the electrostatically responsive marking particles to the charge image. Both dry and liquid developers may be used. Among the more common types of developers are liquid developers where the carrier generally comprises an electrically insulating organic liquid; aerosol or powder-cloud developers where the carrier comprises a gaseous material such as air; cascade developers where the carrier typically is a particulate material such as glass or plastic beads; magnetic brush developers where the carrier typically is a particulate ferromagnetic material; etc. Magnetic brush developers and techniques are described in the following U.S. Pat. Nos.: 2,786,439; 2,786,440; 2,786,441; 2,811,465; 2,874,063; 2,984,163; 3,040,704; 3,117,884; and Re. 25,779. Other dry developers such as cascade developers have been described in a number of U.S. and foreign patents, such as U.S. Pat. Nos. 2,297,691; 2,551,582; 2,618,551; 2,618,552 and in "RCA Review" Vol. 15 (1954) pages 469–484.

Typical dry developers comprise a particulate carrier, for example, non-magnetic particles such as glass beads, crystals of inorganic salts such as sodium or potassium chloride, hard resin particles, metal particles, etc. In addition magnetic carrier particles may be used such as iron, cobalt, nickel and alloys thereof. The size of such carrier particles may vary from about 30 microns to about 1200 microns although particles having a size outside this range may also be used for particular development conditions or developer compositions. If a dry developer comprising a particulate carrier is used, the finely-divided electrostatically attractable resinous marking particles conventionally have a diameter between about ½$\mu$ and about 80$\mu$, with particles between about 2$\mu$ and 15$\mu$ being preferred, although larger particles can be used where desired for particular development conditions or developer compositions. Various techniques such as melt-blending, spray drying, etc. may be used to form marking particles suitable for these conventional dry developers. If desired, colorants may also be incorporated in said marking particles. Typically, such developers contain from about 1–10% by weight of the electrostatically attractable marking particles and from about 90 to about 99% by weight of the particulate carrier. Further detail on formation of marking particles for a conventional dry developer may be found in U.S. Pat. No. 3,533,133 dated Jan. 5, 1971.

Liquid developers are also useful in the process of the present invention. One suitable developer composition for use in the present invention comprises a liquid developer containing a carrier liquid having dispersed therein finely-divided oleophilic resinous marking particles. The particular carrier liquid utilized is not critical to the present invention and may include a variety of electrically insulating organic liquids. Generally these liquid carriers have a dielectric constant less than about 3.0 and a resistivity greater than about $10^9$ ohm-cms. Suitable carrier liquids, typically include hydrocarbon liquids such as isoparaffinic hydrocarbons having a boiling range of from about 145°C. to about 185°C., such as ISOPAR G (Humble Oil and Refining Co.), cyclo hydrocarbons such as cyclohexane, etc. Additional carrier liquids which may be useful in certain situations include oderless mineral spirits, octane, etc.

Oleophilic resins which may be used to form the finely-divided marking particles utilized in both the liquid and dry developer used in the invention may be selected from a wide variety of substances. The following are illustrative of suitable materials generally preferred for use in liquid developers: rosins, including hydrogenated rosins and esters of hydrogenated rosins, alkyl methacrylate resins having from two to five carbon atoms in each alkyl moiety, such as isobutyl methacrylate and N-butyl methacrylate copolymers, etc.; phenolic resins, including modified phenolic resins such as phenol formaldehyde resins; pentaerythritol phthalate; coumarone-indene resins; ester gum resins; vegetable oil polyamides; polycarbonates; alkyd resins, including modified alkyds such as soya oil-modified and linseed oil-modified alkyds, phthalic, maleic and styrenated alkyds, polystyrene and polystyrene-containing resins, etc.; and the like.

Advantageously, the size of the finely-divided resinous marking particles utilized in the liquid developer may vary within the range of about 0.05 micron to about 20 microns, preferably within the range of from about 0.1 micron to about 2.0 microns.

The liquid developer utilized in the present invention ordinarily has a composition as follows: the finely-divided, oleophilic resinous marking particles are present in concentrations within the range of from about 0.01 to about 10 percent by weight of the liquid developer composition and the liquid carrier is present in an amount of from about 80 to about 99.99 percent by weight of the liquid developer.

As described above, the repellent compositions of the inventions are also particularly well suited for use as a dielectric repellent coating in a liquid-developed electrographic image transfer process. In this embodiment of the invention it is advantageous to utilize a repellent composition of the invention containing a fluorinated oil rather than a silicone oil due to the solubility of silicone oils in conventional liquid developer compositions.

In such processes, an electrostatic charge image is formed on the surface of a suitable electrographic element bearing a surface coating of the repellent composition of the present invention in a manner identical to that described above in connection with the electrostatic imaging of waterless printing plates. The electrostatic image bearing element is then contacted with a suitable liquid developer composition as described above to form a wet liquid-developed toner particle image corresponding to the electrostatic image pattern.

The wet toner image thus formed on the electrographic element may be transferred to a suitable image receiving or copy sheet, for example, plain paper, by contacting together the surfaces of the receiving element and the electrographic element while applying a potential difference (hereafter referred to as transfer potential) between these two surfaces of a magnitude and polarity sufficient to cause transfer of the wet liquid-developed toner image.

Although the precise transfer mechanism is not fully understood, it is apparent that electrophoretic migration of the wet toner image from the surface of the original electrographic image-bearing element to the receiving sheet is occurring during transfer.

The polarity of the transfer potential is determined by the polarity of the particular toner image which is developed. For example, when a negative charge image is formed, one would conventionally develop such an image with a so-called positive-working liquid developer, that is, a developer containing positively charged toner particles, to form a positive polarity liquid developed toner image. To transfer this positive polarity toner image one would employ a negative transfer potential. That is, a transfer potential wherein the surface of the receiving sheet is negative with respect to the positive liquid-developed toner image to cause electrophoretic migration of the positive toner image to the negative receiving sheet. Of course, if the toner image to be transferred is a negative image, i.e., an image composed of liquid devloper toner particles bearing a negative charge, then a positive transfer potential is used.

The magnitude of the transfer potential may vary considerably. Typically, a transfer potential of at least 300 volts and preferably greater than about 400 volts is used.

The transfer potential which is applied may be created by a variety of techniques. For example, electroconductive rubber pressure roller(s) contacting the back of the receiving element may be used to provide contact between the receiving element and the wet toner image-bearing electrographic element during transfer and may also be used to apply a direct current transfer potential through the back of the receiving element to the image receiving surface of the receiving element. Other means for applying a transfer potential may also be used, for example, a corona charger mounted adjacent to the back of the receiving element could be used to establish an electric field of suitable polarity and sufficient strength to cause transfer of the wet toner image to the receiving element.

The receiving element itself may be any of a variety of materials. Typically a paper receiving element is used such as plain bond paper. However, a variety of other organic and inorganic materials may also be used depending primarily on the particular type of substrate to which one desires to transfer the wet toner image.

Various optional modifications may be incorporated in the basic transfer process outlined above to further improve transfer efficiency and image quality, and to reduce the amount of excess liquid developer used during development and transfer. For example, a hydrocarbon rinse liquid may be applied to the surface of the wet toner image-bearing electrographic element immediately prior to image transfer to enhance removal of excess amounts of liquid developer from background areas of the image bearing element. Such rinse liquids are known in the art and are described, for example, in Moe et al. U.S. Pat. No. 3,356,498 issued Dec. 5, 1967. Typical of such rinse liquids are isoparaffinic hydrocarbons such as ISOPAR liquids sold by Humble Oil and Refining Co., which have a boiling point in the range of 145°C to 185°C.

In addition, the image receiving surface of the receiving element may have applied thereto an abhesive or simply an oil repellent composition to reduce the amount of liquid developer carrier vehicle which would otherwise be soaked up or absorbed by the receiving element. For example, one may apply an oil repellent coating or sizing to a paper copy sheet. This reduces the amount of excess liquid carrier vehicle carried out by the copy sheet during transfer and also reduces the drying time needed to provide a final dry imaged copy. Any of various oil repellent compositions may be used. One especially useful sizing composition is a fluorinated polymer applied to the surface of the copy sheet in an aqueous-alcoholic media. Particularly useful fluorinated polymers suitable for sizing paper receiving sheets include polymers such as those described earlier herein in formula I. Especially useful as a sizing is ZONYL-RP, an anionic perfluoroalkyl phosphate ester sold by E. I. duPont Nemours and Co.

The following examples serve to illustrate the invention.

EXAMPLE 1

The compositions labelled 1–20 in Table I, below, are coated at 0.001-inch wet thickness upon a subbed poly(ethylene terephthalate) support and cured approximately one minute at 120°–125°C. The solutions are all at 2% solids in Freon TF, a trademark of E. I. duPont Co. for 1,1,2-trichlorotrifluoroethane. Each film is scratched (fingernail) and hand inked with a lithographic ink "Dri Lith Ink", purchased from General Printing Ink Co. (hereinafter referred to as G.P.I.), to test whether or not the layer accepts ink in these defect areas.

Table I

| Sample No. | Weight % Kel F-800[2] (Binder) | Weight % Zepel 2979[3] (Solid Fluorocarbon Polymer) | Weight % Low Surface Energy Oil[4] | Inking of a Scratched Surface |
|---|---|---|---|---|
| 1 | 100 | — | — | Heavy Inking[1] |

Table I-continued

| Sample No. | Weight % Kel F-800[2] (Binder) | Weight % Zepel 2979[3] (Solid Fluorocarbon Polymer) | Weight % Low Surface Energy Oil[4] | Inking of a Scratched Surface |
|---|---|---|---|---|
| (outside invention) | | | | |
| 2 (outside invention) | 90 | — | 10% Krytox 143AC[4] | Heavy Inking[1] |
| 3 (outside invention) | 80 | — | 20% Krytox 143AC | Medium Inking[1] |
| 4 (outside invention) | 60 | — | 40% Krytox 143AC | Slight - Medium Inking[1] |
| 5 (outside invention) | 90 | 10 | — | Heavy Inking |
| 6 (within invention) | 81 | 9 | 10% Krytox 143AC | Slight - Medium Inking |
| 7 (within invention) | 72 | 8 | 20% Krytox 143AC | None - Very Slight Inking |
| 8 (within invention) | 63 | 7 | 30% Krytox 143AC | No Inking |
| 9 (outside invention) | 80 | 20 | — | Medium - Heavy Inking |
| 10 (within invention) | 72 | 18 | 10% Krytox 143AC | None - Very Slight Inking |
| 11 (within invention) | 64 | 16 | 20% Krytox 143AC | No Inking |
| 12 (within invention) | 79.2 | 19.8 | 1.0% D.C. 200[5] | Medium Inking |
| 13 (within invention) | 78 | 19.5 | 2.5% D.C. 200 | No Inking |
| 14 (within invention) | 76 | 19 | 5% D.C. 200 | No Inking |
| 15 (outside invention) | — | 100 | — | Medium - Heavy Inking |
| 16 (outside invention) | 80 | 20 | — | Medium - Heavy Inking |
| 17 (within invention) | 76 | 19 | 5% D.C. 230[6] | Slight - Medium Inking |
| 18 (within invention) | 72 | 18 | 10% D.C. 230 | None - Very Slight Inking |
| 19 (within invention) | 76 | 19 | 5% F.S. 1265[7] | Slight - Medium Inking |
| 20 (within invention) | 72 | 18 | 10% F.S. 1265 | None - Very Slight Inking |

[1]Surface is not scratched but accepts ink, i.e. surface is not ink repellent
[2]Kel F-800 is a tradename of 3M Co. for copolymer of vinylidene fluoride and trifluorochloroethylene
[3]Zepel 2979 is a tradename of E. I. duPont Nemours & Co. for fluoropolymers believed to have the structure shown in formula XIV hereinabove
[4]Krytox 143AC is a tradename of E. I. duPont Nemours & Co. for perfluoroalkyl polyether
[5]D.C. 200 is a tradename of Dow Corning for dimethyl polysiloxane fluid
[6]D.C. 230 is a tradename of Dow Corning for alkylaryl polysiloxane fluid
[7]F.S. 1265 is a tradename of Dow Corning for

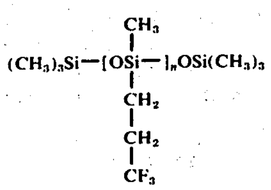

As can be seen from the above data, a combination of binder, solid fluorocarbon polymer, and oil significantly decreased the amount of ink accepted by a scratched surface of the plate thus indicating its ability to retain its oil repellent properties even when subjected to surface defects caused by abrasion. The resulting printing plate provides improved inking latitude.

EXAMPLE 2

The following compositions labelled Sample NO. 1–3 in Table II contain Kel F-800 and TLF-2916 with and without low surface energy oils. The compositions are solvent coated at 0.001-inch wet thickness on subbed poly(ethylene terephthalate) support and cured 1 minute at 12°–125°C. Each coating solution contains 2 weight solids in FREON TF solvent. Each element is run on a modified Addressograph-Multigraph Model 120 Multilith Duplicator without the fountain solution. The plates are inked using a modified G.P.I. Dri Lith Ink which contained aluminum isopropoxide. The following results are obtained:

TABLE II

| Sample No. | Weight % Kel F-800 | Weight % TLF-800 | Weight % Low Surface Energy Oil | Press Results |
|---|---|---|---|---|
| 1 | 80 | 20 | — | Coating pick off at 100 prints |
| 2 | 76 | 19 | 5% D.C. 200 | Slight scumming and pin point inking at 400 prints |
| 3 | 64 | 16 | 20% Krytox 143AC | Slight pin point inking and |

TABLE II-continued

| Sample No. | Weight % Kel F-800 | Weight % TLF-800 | Weight % Low Surface Energy Oil | Press Results |
|---|---|---|---|---|
| | | | | wear at 1200 prints |

The above data indicates that the addition of either the dimethyl polysiloxane fluid (D.C. 200) or the perfluoroalkyl polyether (Krytox 143AC) fluid significantly extended the useful lifetime of the printing plate.

EXAMPLE 3

This example illustrates the use of a variety of low surface energy oils added to a coating formulation to improve the resistance of scratch defects to inking.

The following compositions labelled Sample No. 1–6 in Table III are solvent-coated at .001-inch wet thickness on subbed poly(ethylene terephthalate) support and cured 1 minute at 120°C. The coating solution contains about 2 weight percent solids in a FREON TF solvent. Each layer is scratched (fingernail) and hand inked with G.P.I. Dri Lith Ink. The following results are obtained.

TABLE III

| Sample No. | Weight % Kel F-800 | Weight % Zepel 2979 | Low Surface Energy Oil | Inking of Scratched Surface |
|---|---|---|---|---|
| 1 (outside invention) | 80 | 20 | — | Inked |
| 2 (within invention) | 64 | 16 | 20% Krytox 143AC | None |
| 3 (within invention) | 72 | 18 | 10% Fluid A | None |
| 4 (within invention) | 72 | 18 | 10% Fluid B | None |
| 5 (within invention) | 72 | 18 | 10% Fluid C | None |
| 6 (within invention) | 72 | 18 | 10% Fluid D | None |

Fluid A -
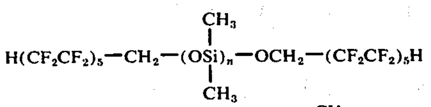

Fluid B -
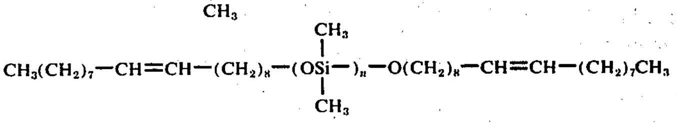

Fluid C -
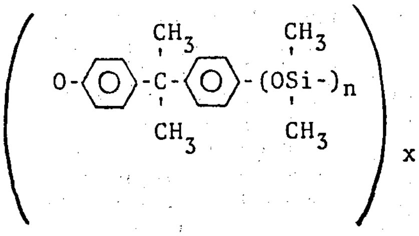

Fluid D -
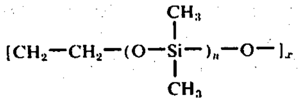

wherein $n$ and $x$ in the above formulas is an integer greater than about 4.

EXAMPLE 4

This example illustrates the use of a variety of solid fluorocarbon polymers with Krytox 143AD fluid, a fluorocarbon oil, as the oil component. No binder is used. Each composition labelled Sample No. 1–6 in Table IV is solvent-coated as in Example 3 at 0.001-inch wet thickness on subbed poly(ethylene terephthalate) support and cured 1 minute at 120°–125°C. Each layer is scratched and hand inked as in Example 3.

TABLE IV

| Sample No. | Weight % Solid Fluorocarbon | Weight % oil (Krytox 143AD) | Scratch Inking |
|---|---|---|---|
| 1 (outside invention) | 100% Polymer No. 1 | — | Slight overall background inking-scratch inked |
| 2 (within invention) | 80% Polymer No. 1 | 20% | Clean background with no scratch inking |
| 3 | 100% Polymer No. 2 | — | Same as No. 1 above |

TABLE IV-continued

| Sample No. | Weight % Solid Fluorocarbon | Weight % oil (Krytox 143AD) | Scratch Inking |
|---|---|---|---|
| (outside invention) | | | |
| 4 | 80% Polymer No. 2 | 20% | Same as No. 2 above |
| (within invention) | | | |
| 5 | 100% Polymer No. 3 | — | Scratch inked |
| (outside invention) | | | |
| 6 | 80% Polymer No. 3 | 20% | No background inking-very slight scratch inking |
| (within invention) | | | |

Polymer No. 1 — poly(hexafluoroisopropylmethacrylate)
Polymer No. 2 — poly(vinylheptafluorobutyrate)
Polymer No. 3 — poly(pentafluoropropyl acrylate)

EXAMPLE 5

A series of conducting supports are overcoated at 0.9 g/ft$^2$ with an insulating layer comprising Gelva C5-V16, a poly(vinyl acetate) resin sold by Monsanto. The Gelva is overcoated from a slightly alkaline (ammonia) aqueous solution containing 20 weight percent solids content.

The elements are then overcoated at 0.001-inch wet thickness with a solution containing 2 weight percent solids content. The solids consist of a composition containing 64 weight percent Kel F-800, 16 weight percent TLF2916 and 20 weight percent Krytox 143AC. This coating is then cured at 125°F for one minute.

These elements are imaged by forming an electrostatic charge pattern on the surface of the repellent composition and then developed with either a liquid or dry electrographic developer containing oleophilic toner particles. The oleophilic toner image is then fused to the surface of the repellent composition. The toner images accept ink and exhibit good adhesion.

The above-described image elements are then placed on a modified printing press as in Example 2 and multiple copies prepared. The ink used is G.P.I. Dri Lith Ink containing an aluminum isopropoxide additive.

Example 6

To illustrate the use of the repellent composition of the present invention in an electrographic liquid development process, the following demonstration may be carried out. A rotating electrophotographic drum having a conducting base over which is coated a heterogeneous organic photoconductive layer as described in Light, U.S. Pat. No. 3,615,414 is prepared. A thin poly(vinyl acetate) subbing is applied to the surface of the photoconductive layer and the repellent composition of the present invention is applied over the poly(vinyl acetate) layer as a top coat. The dry composition of the repellent top coat is as follows:

| Component | Weight % |
|---|---|
| Fluorinated polymer XV | 15% |
| Copolymer of vinylidene fluoride and tetrafluoroethylene | 55% |
| Fluorinated Oil (Krytox AD) | 30% |
| FEP TEFLON powder | 20% |

The rotating drum is then sequentially charged uniformly to about negative 750 volts, exposed imagewise to visible light to form a latent electrostatic charge pattern on the surface of the drum, and contacted with a positive-working liquid developer containing finely-divided resinous toner particles dispersed in a hydrocarbon carrier liquid to develop a wet toner image on the surface of the drum corresponding to the charge pattern. Excess liquid developer is then removed from the background areas of the developed image on the drum surface. Immediately thereafter, while still wet, the toner image bearing drum is contacted with a plain paper copy sheet in the presence of a negative transfer potential as follows: A pair of rubber electroconductive pressure rollers contacting the back of the copy sheet press the front surface of the sheet against the drum surface bearing the wet toner image. A negative transfer potential of 400 volts (relative to the positively charged toner image carried on the drum) is applied through the back of the copy sheet by the first rubber roller and a negative transfer potential of about 600 volts (relative to the toner image on the drum) is applied through the back of the copy sheet by the second roller. As a result, nearly 100 percent complete transfer of the wet image from the drum to the copy sheet occurs providing a sharp, good quality image on the paper copy sheet. The damp copy sheet is then dried and the image fixed thereon. Similar results are obtained using plain paper sized with an alcoholic-aqueous solution of ZONYL RP fluoropolymer except that the copy sheet absorbs much less liquid developer carrier vehicle thereby substantially reducing the wetness and drying of the final copy sheet. The process is repeated and a total of over 500 copies are obtained from a single image frame on the drum before the repellent coating on the surface of the photoconductive drum fails to provide good quality transfer images.

The invention has been described in detail with particular reference to preferred embodiments thereof, but it will be understood that variations and modifications can be effected within the spirit and scope of the invention.

We claim:

1. A repellent composition comprising from about 1 to about 40 percent by weight of an oil of low volatility having a surface energy of less than about 27 dynes/cm selected from the group consisting of fluorinated oils and poly(siloxane) oils and from about 5 to about 98 percent by weight of a solid fluorinated polymer having repeating units of the following formula:

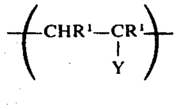

wherein R$^1$ represents hydrogen or an alkyl group having 1 to about 4 carbon atoms and wherein Y represents a moiety having one of the following formulas:

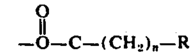

or

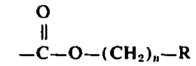

wherein R is a fluorinated alkyl or a fluoroalkoxy substituted fluorinated alkyl having 1 to about 20 carbon atoms and *n* is 0 or 1.

2. The composition of claim 1 wherein said repellent composition comprises up to about 85 percent by weight of a polymeric binder.

3. The composition of claim 1 wherein said repellent composition comprises up to about 85 percent by weight of a polymeric binder selected from the group consisting of silicone resins, poly(acrylic ester) resins and poly(methacrylic ester) resins, fluorinated hydrocarbon resins, and mixtures thereof.

4. A repellent composition comprising from about 2.5 to about 40 percent by weight of a fluorinated oil having a surface energy less than about 27 dynes/cm, from about 50 to about 80 percent by weight of a fluorinated hydrocarbon resinous binder, and from about 5 to about 98 percent by weight of a solid fluorinated polymer having repeating units of the following formula:

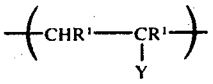

wherein $R^1$ represents hydrogen or an alkyl having 1 to about 4 carbon atoms and wherein Y represents a moiety having one of the following formulas:

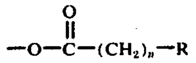

or

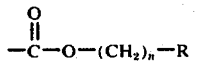

wherein R is a fluorinated alkyl or a fluoroalkoxy-substituted fluorinated alkyl having 1 to about 20 carbon atoms and *n* is 0 or 1.

5. The repellent composition of claim 4 wherein said composition comprises up to about 40 percent by weight of a particulate fluorocarbon powder.

6. The repellent composition of claim 4 wherein R is a perfluorinated alkyl or a perfluoroalkoxy-substituted fluorinated alkyl.

* * * * *